United States Patent [19]

Smith et al.

[11] Patent Number: 4,684,941

[45] Date of Patent: Aug. 4, 1987

[54] METHOD OF COMMUNICATIONS BETWEEN REGISTER-MODELLED RADIO DEVICES

[75] Inventors: Paul F. Smith, Ft. Worth; Eric R. Schorman, Bedford; Timothy M. Burke, Ft. Worth, all of Tex.

[73] Assignee: Motorola, Inc., Schaumburg, Ill.

[21] Appl. No.: 684,999

[22] Filed: Dec. 21, 1984

[51] Int. Cl.[4] .............................................. H04Q 7/00
[52] U.S. Cl. ......................... 340/825.52; 340/825.44; 455/33
[58] Field of Search ........... 340/825.52, 825.5, 825.44; 370/94, 99, 60, 42; 375/7; 455/68, 70, 56, 33

[56] References Cited

U.S. PATENT DOCUMENTS

| 4,225,919 | 9/1980  | Kyu et al.     | 370/99     |
|-----------|---------|----------------|------------|
| 4,481,670 | 11/1984 | Freeburg       | 455/56     |
| 4,536,874 | 8/1985  | Stoffel et al. | 370/94     |
| 4,590,473 | 5/1986  | Burke et al.   | 340/825.52 |
| 4,594,591 | 6/1986  | Burke          | 340/825.07 |

OTHER PUBLICATIONS

"Systems 90 Replacement Configuration" filed with Application Dec. 21, 1984 as Appendix I, pp. 1-85.
Paper by S. Becher et al, describing the "Lightning Serial Bus" filed with application Dec. 21, 1984 as Appendix II, pp. 1-48.
Motorola Systems 90-S brochure filed Dec. 21, 1984.

Primary Examiner—Donald J. Yusko
Attorney, Agent, or Firm—F. John Motsinger; Edward M. Roney

[57] ABSTRACT

A register-modelled radio system comprising a plurality of register-modelled processors having addressable registers for modelling the virtual state of the processor; a serial bus, interconnecting the register-modelled processors for communicating between the addressable registers; and a communications protocol for passing information to or from the addressable registers, whereby the virtual state of a radio portion may be determined or altered by, respectively, communicating information from or to the addressable registers. The communications protocol further comprises an information packet having an address, an operation code, optional data, and an error detection device, such as a cyclical redundancy check packet. The operation code is chosen from the group of primitive operation codes reset, read, write, bit set, bit clear, acknowledge, and negative acknowledge.

8 Claims, 14 Drawing Figures

Fig. 12a SIDE VIEW

Fig. 12b FRONT VIEW

Fig. 12c TOP VIEW

METHOD OF COMMUNICATIONS BETWEEN REGISTER-MODELLED RADIO DEVICES

CROSS REFERENCE TO RELATED APPLICATIONS

The instant patent application is related to the following patent applications filed on even date herewith and are hereby incorporated by reference thereto and made a part hereof as if fully set forth herein:
Internally Register-Modelled, Serially-Bussed Radio System
Serial Link Communications Protocol
Human-Engineered Radio Control Unit

THE FIELD OF INVENTION

The invention disclosed herein is concerned with radio design structures.

More particularly, this invention relates to two-way, mobile radio design structures.

BACKGROUND OF THE INVENTION

The need for this invention arose from problems of terribly inflexibly architected radio structures, from complex and unreliable cabling interconnections between radio peripheral components and from the general lack of human engineering as a design goal.

Current mobile radio products are designed around subsystem control options where each option is independent in function from one another, yet highly interdependent upon others for command and control. Accordingly, due to the high degree of interdependence, a total radio system had to be envisioned prior to designing any individual subsystem. Typically, one or two major system components were responsible for orchestrating all of the command and control overhead for the other subsystems. The radio structure was constrained by the hardware, command and control structure envisioned at the design inception of the radio system. Later radio subsystems were difficult to accommodate because the basic structure had already been cast. Thus, the radio system, once architected, did not allow for convenient integration of new subsystems, features and enhancements.

Moreover, current mobile radios require fairly complex inter-cabling among option subsystems which are, often, exclusively located in the control head package. The radio to control head cabling is also complex, costly and unreliable. Each individual switch, control or indicator was separately hard-wired to the subsystem or option that it was to control. A mobile radio, fully configured, typically contains a birds-nest of cabling. For example, a 35 conductor cable is typical for full option capability. Thus, many of the field problems encountered with mobile radios have been attributed to faulty cabling and associated connectors of the control head system.

Others have serialized the heretofore parallel link between the control head and the basic radio. Still others have register-modelled the entire mobile radio system with respect to the R.F. link. However, none have internally, serially-bussed every subsystem interconnecting link and internally, register-modelled every device to form a completely new radio architecture.

Current control head packages are physically large when one or more subsystem option is configured and often require redundant circuitry for power supply and general interfacing.

Human interface is lacking due to the multiplicity of generic, cryptically-identified switches, power-consuming, cryptically-identified indicators and erroneous or non-existent operator feedback and verification.

Mode select systems where the radio may operate in a variety of communication environments and sophisticated data control systems are seriously limited in functional capabilities because of this current inflexible, confusing and complex approach.

The structure herein proposed, eliminates many of these problems and provides a method for future expansion with a STRUCTURED subsystem interface. Moreover, the concepts to be presented apply to dash-mount, trunk-mount and remote-controlled mobile radio systems, alike.

The instant invention solves the problem by internally, register-modelling and internally, serially-bussing the basic radio structure with addressable, "smart" peripheral radio subsystems to allow for inherent flexibility and expansion.

This invention represents a significant advance over the prior art and over this technical field by providing a reliable, internally, register-modelled, addressable, internally serially-bussed mobile radio architecture with logical, human engineered control and operator validation feedback.

BRIEF SUMMARY OF THE INVENTION

It is the object of the present invention to provide a reliable, internally, register-modelled, addressable, internally, serially-bussed mobile radio architecture with logical, human engineered control and operator validation feedback.

It is a further object of the invention to provide incredibly flexibly architected radio structures.

It is another object of the invention to distribute the command and control processing among various radio subsystems, providing them with a greater degree of flexibility and autonomy.

Yet another object of the present invention is to provide simple and reliable cabling interconnections between radio peripheral components.

A further object of the invention is to employ a "smart" control head that may be multiplexed with each functional subsystem to facilitate operator input, output and feedback required for the command and control of each subsystem.

Another object of the invention is to provide a radio system capable of having a multiplicity of various radios, functions, features and enhancements in a single, mobile system without unnecessary redundancy of control heads and functional subsystems.

A final object of the invention is to provide logical, human engineered system control and operator validation feedback.

The ultimate object is to provide a reliable, internally, register-modelled, addressable, internally, serially-bussed mobile radio architecture with logical, human engineered control and operator validation feedback.

In accordance with the present invention, there is provided a register-modelled radio system comprising a plurality of register-modelled processors having addressable registers for modelling the virtual state of the processor; a serial bus, interconnecting the register-modelled processors for communicating between the addressable registers; and a communications protocol for passing information to or from the addressable registers, whereby the virtual state of a radio portion may be determined or altered by, respectively, communicating information from or to the addressable registers. The communications protocol further comprises an information packet having an address, an operation code, optional data, and an error detection device, such as a cyclical redundancy check packet. The operation code is chosen from the group of primitive operation codes reset, read, write, bit set, bit clear, acknowledge, and negative acknowledge.

Thus, there has been provided a reliable, internally, register-modelled, addressable, internally, serially-bussed mobile radio architecture with logical, human engineered control and operator validation feedback.

BRIEF DESCRIPTION OF THE DRAWINGS

Additional objects, features, and advantages, in accordance with the present invention, will be more clearly understood, by way of unrestricted example, from the following detailed description, taken together with the accompanying drawings, in which.

The invention will be readily appreciated by reference to the detailed description when considered in conjunction with the accompanying drawings in which like reference numerals designate like parts throughout the figures.

THE DESCRIPTION OF THE PREFERRED EMBODIMENT

Figure 1:
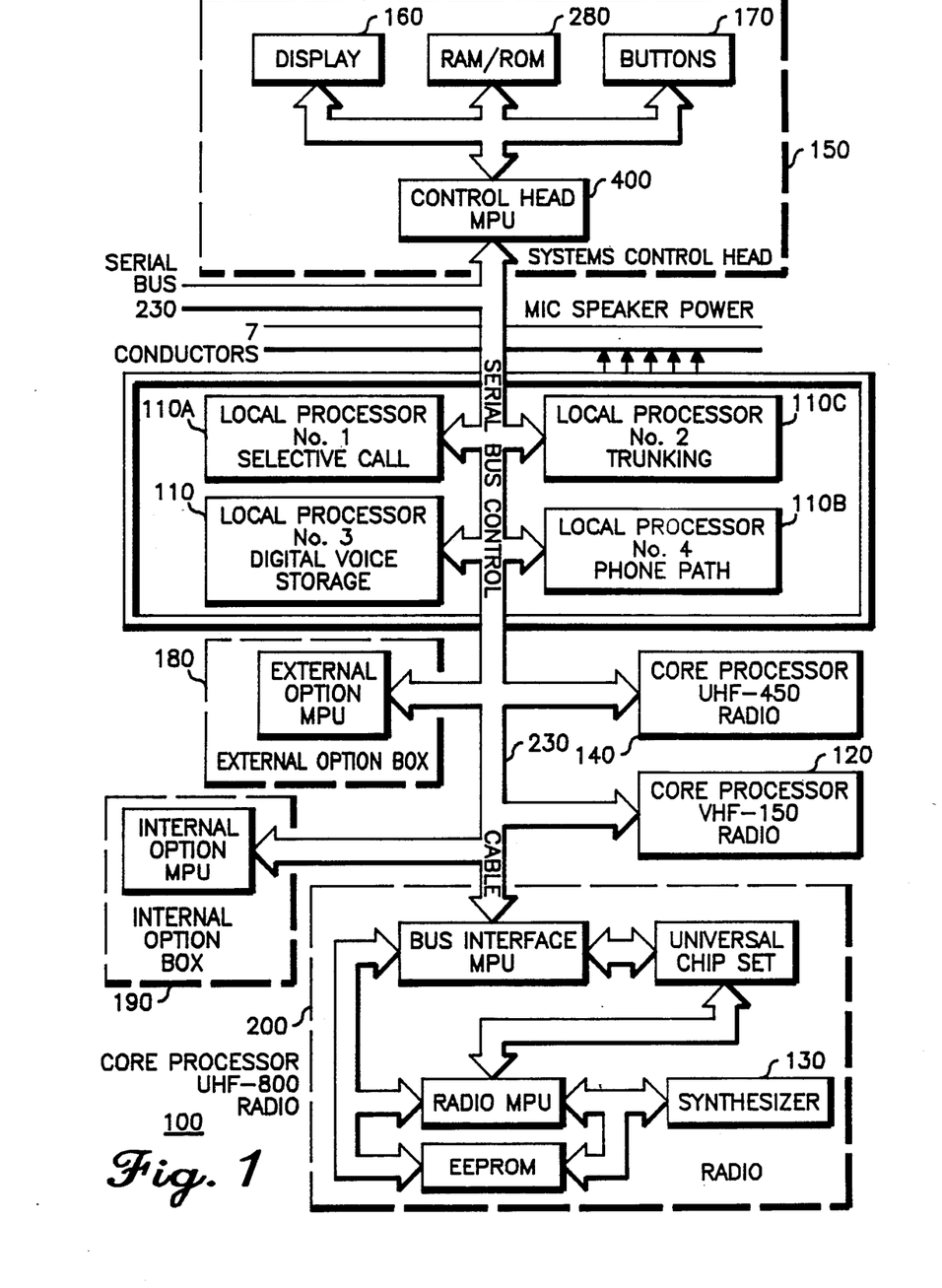
FIG. 1 is a block diagram illustrating a reliable, internally, register-modelled, addressable, internally, serially-bussed mobile radio architecture with logical, human engineered control and operator validation feedback in accordance with the preferred embodiment of the present invention.

FIG. 1 is a block diagram illustrating a reliable, internally, register-modelled, addressable, internally, serially-bussed mobile radio architecture with logical, human engineered control and operator validation feedback in accordance with the preferred embodiment of the present invention.

Figure 2:
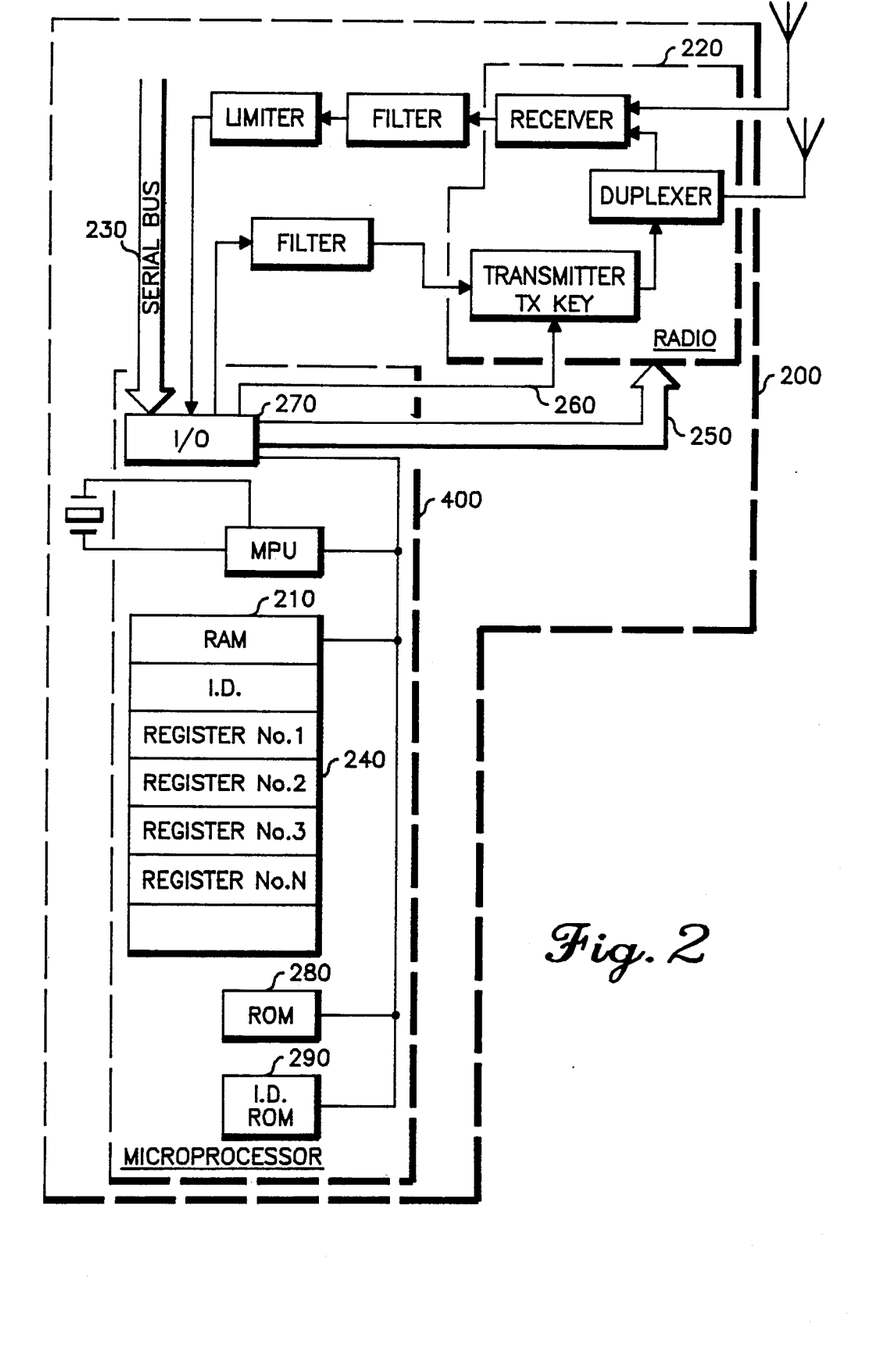
FIG. 2 is a block diagram illustrating the general internally register-modelled structure that is representative of each subsystem.

FIG. 2 is a block diagram illustrating the general internally register-modelled structure that is representative of each subsystem. This basic structure provides the radio system the capability of having a multiplicity of various radios, functions, features and enhancements in a single, mobile system without unnecessary redundancy of control heads and functional subsystems.

The General Register Model

As illustrated in FIG. 2, a general approach to radio system design is offered by viewing a radio peripheral 200 as a digital machine that contains a set of defined, addressable registers 210. The contents of the set of registers 210 can then be used to define the operations that a radio device 220 is to perform and the virtual state of the device 220, peripheral, or subsystem 200 at any point in time.

To manipulate the contents of the registers 210 which control the device 220, a small set of general, primative instructions has been defined. The most primitive are instructions to read or write (alter) the contents of an addressed register 210. These primitive instructions are transmitted over a bus 230 to cause data to be written into, read from, modified, or tested with respect to any addressed register 240 in the peripheral 200. The primitive instruction set and transmission format remain the same for all peripherals 200; independent of future functional enhancements that may be added to the device 220, peripheral 200, or the various combinations of different peripherals 200 that might comprise future systems (FIG. 1).

Since the functions of the various peripherals 200 are controlled by the contents of its register set 210 and each register's contents 240 can be addressed by a single instruction; combinations of similar primitive functions (macros) can be invoked to perform new major peripheral 200 or device 220 function in parallel. This feature provides the capability for a peripheral 200 to respond to new "commands" without actually implementing new command operation codes in the peripheral 200. The primitive instruction set can remain stable, promoting upward compatibility of peripherals 200.

A conceptual architecture for integrating current and future system options and command/control subsystems with common linkages into a structured unified two-way mobile radio system is further disclosed and illustrated in FIG. 1.

GENERAL

What is disclosed in FIG. 1 is a multi-processor system utilizing a common serial linkage 230 for parametric data transfer and system control. Each major system option or function is independently performed by "local" processors 110 (i.e., peripherals 200) and interfaced to the system on a serial data link 230.

Several definitional terms are used to describe the four basic elements of the system; the CORE processor 120, 140 & 200, the CONTROL processor 150, LOCAL processors 110 and the linkage BIS 230. The minimum system contains the Core processor 200, the Control processor 150 and the Bus 230.

The CORE processor 200 directly interfaces to the radio 220 (FIG. 2) and performs many of the low-level tasks 250 (FIG. 2) associated with a particular radio. These tasks may include synthesizer/element control 130, transmit power level control, audio muting, channel scanning logic, receive/transmit and transmit/receive sequence timing 260 (FIG. 2), subaudible signalling generation and detection, hardware diagnostics, etc. 250 (FIG. 2).

The Core processor 200 also provides an interface 270 (FIG. 2) to the serial Bus 230 where each of the relevant tasks are available to the Control processor 150 or other Local processors 110 on the Bus 230.

The Core processor 200 is simply a collection of various "drivers" 210/280 (FIG. 2) that intimately define the radio interface. The drivers are controlled or scheduled by the Control processor 150 or Local processors 110. The interface to the drivers consists of a structured map 210 which defines the entry and exit parameters 240 necessary to perform the function of the driver 280.

As an example consider the driver which changes the radio's 200 frequency. One radio 200 contains a frequency synthesizer 130 requiring 24 bits of information, control and timing signals and a refresh protocol. Another radio 120 contains channel elements requiring simple element selection logic.

The driver for the first radio 200 is unique and much more complex than the driver for the other radio 120. However, both drivers contain a "common" standard or interface to the system, i.e., the driver parameters 240 (FIG. 2) are standard enough to allow use of that driver 280 (FIG. 2) by other processors in the system 100.

The Core processor 200 should be as simple as possible to interface to the radio hardware 220 (FIG. 2) without an integrated operating system. The Control processor 150 or Local processors 110 provide the necessary logic to control the system 100.

The Control processor 150 (i.e., control head) provides the human interface to the system 100 and is common to all radio products 120, 140 and 200. Its primary function is to control the display 160 and keyboard 170 entry of data and control information. It also acts as a system monitor providing status information to the user.

The Control processor 150 also interfaces to the serial bus 230 providing access of its drivers 280 to other processors 110 in the system 100 in a standard fashion. As a control element, it provides the operating system logic for the Core processors 120, 140 and 200 and Local processors 110.

Any and all unique parameters 280 of the system 100, such as frequency information, Unit ID codes 290 (FIG. 2), PL/DPL codes, mode linkages, scan lists, etc., are provided to all system peripherals 200, 110, etc. by the Control processor 150. It provides the "data base" 280 of the system 100 and transfers this information over the bus 230. This does not imply that the non-volatile code information 290 (FIG. 2) is, necessarily, resident in the Control processor 150. It does imply that any and all relevant code information may be obtained 290 (FIG. 2) or modified by the Control processor 150.

An example is provided by the PL/DPL drivers 280 resident in the Core processor 200. The total set of possible seed codes for Pl and DPL may be hard programmed in the Core processor memory 290. This data base 210, 280 and 290 will be accessible to the Control processor 150 for distribution 230 to other Local processors 110 requiring the codes, i.e., Local processors 110 must go "through" the Control processor 150 to obtain the codes. The Control processor 150 may also contain its own data base 280 of parametric information.

The keyboard system 170 of the Control processor 150 will be general enough to accommodate simple mode control systems and sophisticated data entry systems. Various levels of entry modes will be available to multiplex the use of the keyboard 170 and display 160. The simple mode controlled systems will use a one-to-one mapping (i.e., so-called "soft" keys) of the keyboard keys 170 for mode selections.

Analog control functions, such as, volume and squelch will be converted from the keyboard 170 in digital form and then converted to analog form by the Core processor 120, 140 and 200.

The display system 160 will include alphanumeric graphics with user prompt (i.e., so-called menu) logic and error control logic with operator feedback. The display system 160 is controlled by the Control processor 150 and is accessible 230 to other Local processors 110 in the system 100 for status and monitoring purposes as well as keyboard 160 entry feedback.

The Local processors 110 provide the options 180 and expansions of the system 100. Major communications functions, such as Digital Voice Storage, Telephone signalling, Multi-frequency and Single-frequency trunking, etc., are all Local processor systems 110.

Local processors 110 may be mated to the serial bus 230 internal to 190 or external to 180 the radio package 200. Local processors requiring interface to the audio, detector and modulator circuits 190 are located within the radio package 200. However, all control and data is communicated on the serial bus 230.

All Local processors 110 have a common structured interface allowing their use with all radio products 110, 120, 140, and 200 and option subsystems 180 and 190. This approach eliminates the redesign of these major systems for each particular radio configuration, which is the general approach used today. It makes the system 100 "I/O independent."

The serial Bus 230 provides the physical interface of all processors 110, 120, 140, 150, 180, 190 and 200 in the system 100. It consists of a 2-wire link (signal and ground) and may be bussed internal 190 to the radio as wall as external 180. When used externally, the cable may be twisted-pair, shielded-audio or fiber-optic. The link may also be remoted via infrared, ultrasonic or RF.

Figure 3:
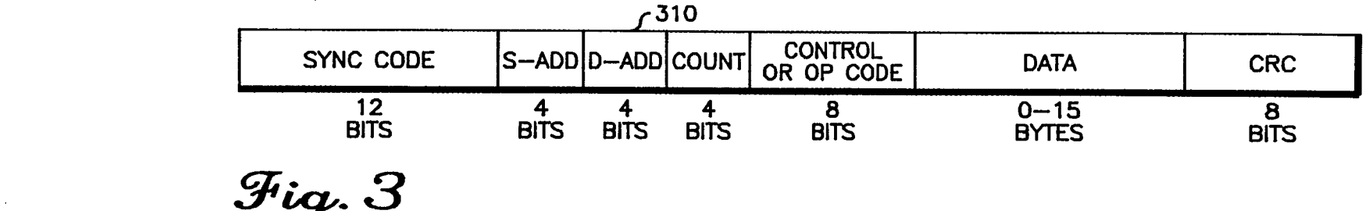
FIG. 3 is the serial link communications protocol according to the present invention.

The communications protocol, illustrated in FIG. 3, is designed for simplex operation of synchronous data packets containing source and destination addressing, control, data and error detection codes.

It is desirable that the Control 150, Core 120, 140 & 200 and Local processors 110 perform all of the required signalling required for the Bus 230 interface to reduce the costs of the system 100.

CORE PROCESSOR

Returning to FIG. 2, the Core processor 200 provides the interface to the radio hardware system 220 and the serial Bus 230. It does so by implementing various drivers 280 that are generic to that hardware configuration.

CONTROL DRIVERS

The drivers 280 make up the essential control elements that are necessary to "drive" the commands generated by the Control processor 150 and Local processors 110. In this regard, the drivers 280 are global and accessible to all other elements on the Bus 230.

Each driver 280 contains a Bus 230 interface specification that is unique to the function the driver performs and standard among Core processors 120, 140 and 200. An example will illustrate this approach.

Consider the driver used to select the current receive frequency of the radio. The example uses three methods of frequency selection by three unique radio products and their associated Vore processors 120, 140 and 200.

Figure 4:
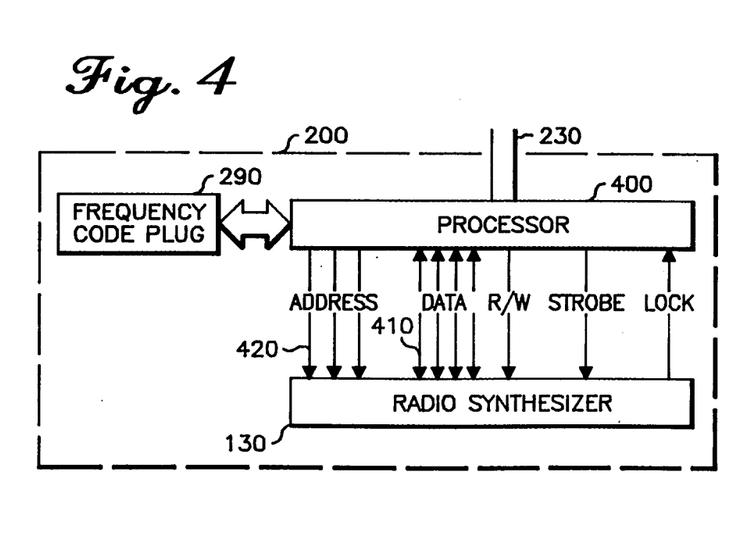
FIG. 4 is a register-modelled synthesized radio according to the preferred embodiment of the present invention.

Referring to FIG. 4, the first radio 200 contains a synthesizer 130 requiring 24 bits of raw data for frequency selection. The data is provided by the Core processor 400 in a parallel fashion by way of a 4-bit bidirectional data bus 410 and a 3-bit address bus 420. The Core processor 400 may read or write the synthesizer data by selecting one of the "N" addressable registers 210 (FIG. 1) contained within the synthesizer system and strobing the appropriate data.

After writing new data into the synthesizer 130, the Core processor 400 may read the register contents 210 to verify the write. If the write operation was successful, the command is considered complete. If the write was not successful, an error status is reported 230 to the command originator. This system does not require a "refresh" operation by the Core processor 400.

Returning to FIG. 2, the driver 280 to select the current receive frequency of the first radio 200 requires two entry parameters and one exit parameter. The entry parameters 240 are the receive frequency name, (e.g., RF-1, RF-2, RF-5, etc.) and the address of the device originating the command. The exit parameter is an error control code that is returned 230 to the device originating the command. Error-0 designates a successful operation, Error-1 designates a faulty write operation and Error-2 designates an improper entry parameter selection.

Upon entry, the driver 280 takes the frequency name and cross-checks that name with available receive frequencies stored in the frequency codeplug 290. If the name is valid, the driver 280 obtains the 24 bits of raw data from the codeplug 290 and attempts to change the receive frequency. If the name is invalid, the driver 280 signals 230 the originating device with an Error-2 parameter 240.

The driver 280 then goes through the procedure to write the receive frequency data to the synthesizer 130. The written data is then read for verification. If the write was successful (data properly loaded and synthesizer locked), the driver signals the originator with an Error-0 parameter. If the write was faulty, an Error-1 parameter is signalled.

If at any time the synthesizer 130 should go out of lock the Core processor 400 may signal 230 the last originating device with an Error-1 parameter.

Figure 5:
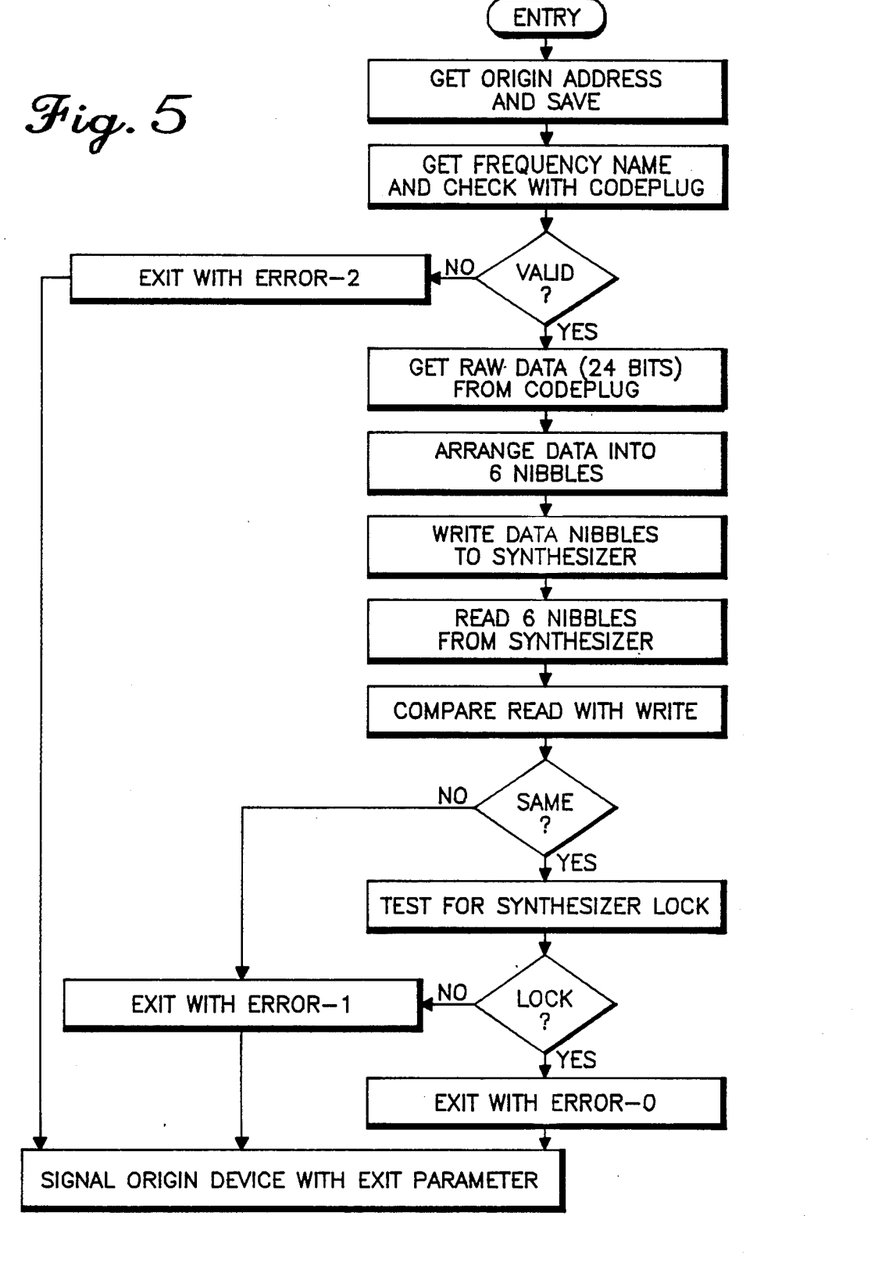
FIG. 5 is an exemplary flow diagram of a device driver routine for the synthesized radio of FIG. 4.

The flow diagram of the receive frequency driver for the first radio 200 is shown in FIG. 5.

Figure 6:
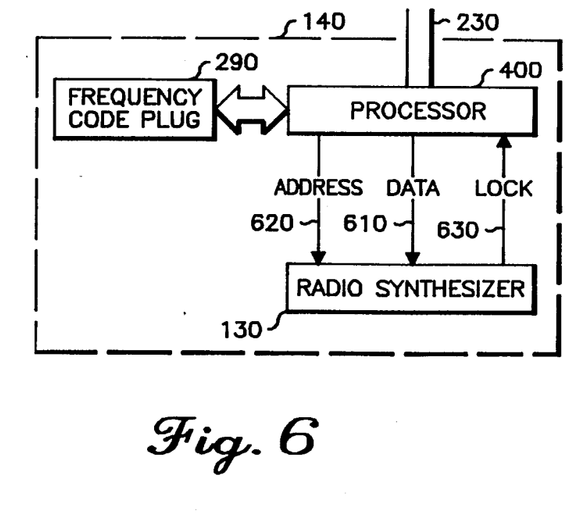
FIG. 6 is another register-modelled synthesized radio according to the preferred embodiment of the present invention.

A second radio 140, illustrated in FIG. 6, also contains a synthesizer system 130 for frequency selection. Unlike the first radio 200, the synthesizer 130 of the second radio 140 requires a serial load operation with 20 bits of raw data and does not allow the Core processor 400 to read the synthesizer register contents 210. For reliability purposes, the Core processor 400 must refresh the synthesizer 130 periodically.

The Core processor 400 of the second radio 140 must provide the standard entry and exit interface as outlined for the first radio 200 and provide the proper timing and control required for the synthesizer 130. This may include assembly of the data 610 into the proper serial format, generating the serial clock 620, generating start/stop bits, etc.

The driver 280, to select the current receive frequency of the second radio 140, requires the same entry and exit parameters 210 as the first radio 200 (i.e., frequency name and originating device address for entry and error control code for exit). Thus, the instruction sequence and operation codes to be transmitted in the bus communications protocol are identical for all radios 120, 140 and 200.

More particularly, in the second radio 140, upon entry, the driver 400 cross-checks the frequency name with the frequency codeplug 290 and reports an error if the name is invalid. The driver 400 then obtains the 20 bits of raw data from the codeplug 290 and attempts to change the receive frequency by properly formatting the serial data 610 and generating the proper timing signals 620.

Since the loaded data 610 of the second radio 140 may not be read by the Core processor 400, a refresh operation must be performed periodically and an Error-1 exit parameter will be signalled 230 to the originating device only if synthesizer 130 lock 630 is not achieved. Otherwise, an Error-0 code is signalled 230.

Figure 7:
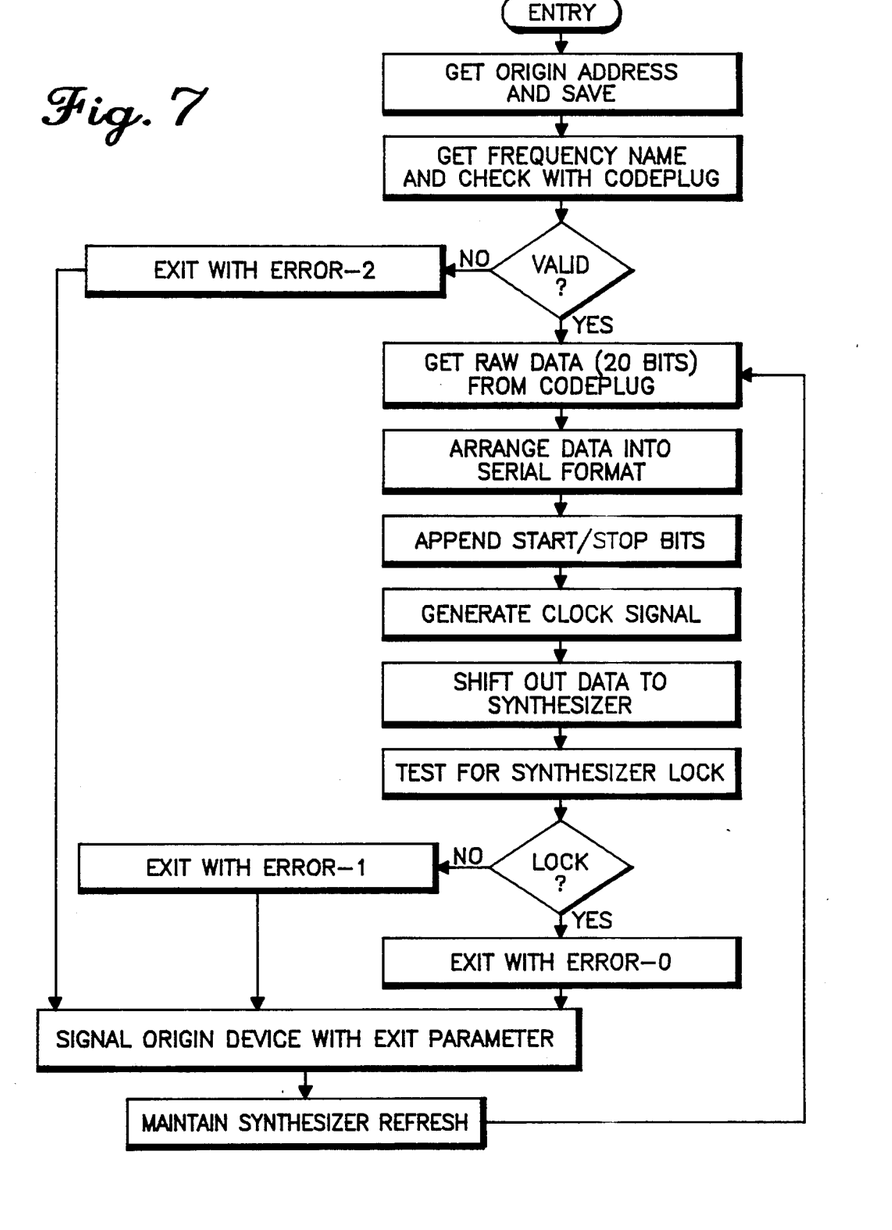
FIG. 7 is an exemplary flow diagram of a device driver routine for the synthesized radio of FIG. 6.

The flow diagram of the receive frequency driver for the second radio is illustrated in FIG. 7.

Figure 8:
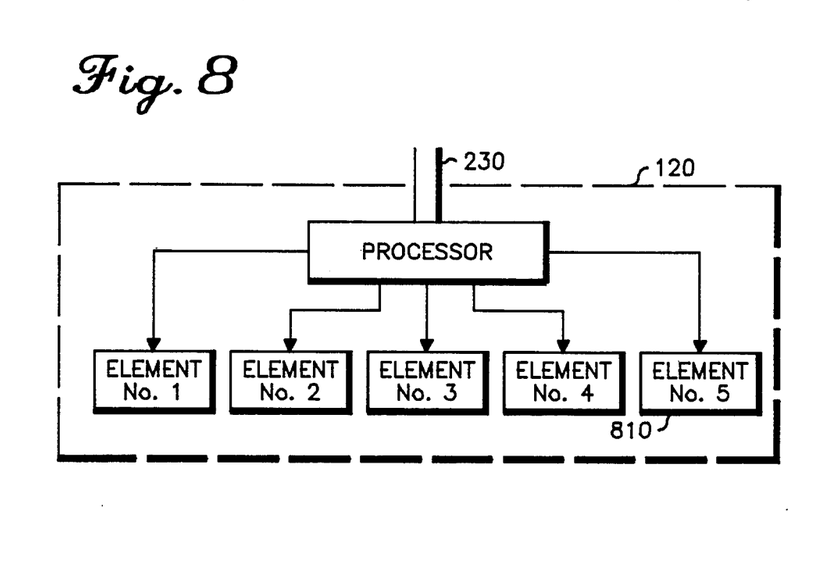
FIG. 8 is a register-modelled channelized radio according to the preferred embodiment of the present invention.
Figure 9:
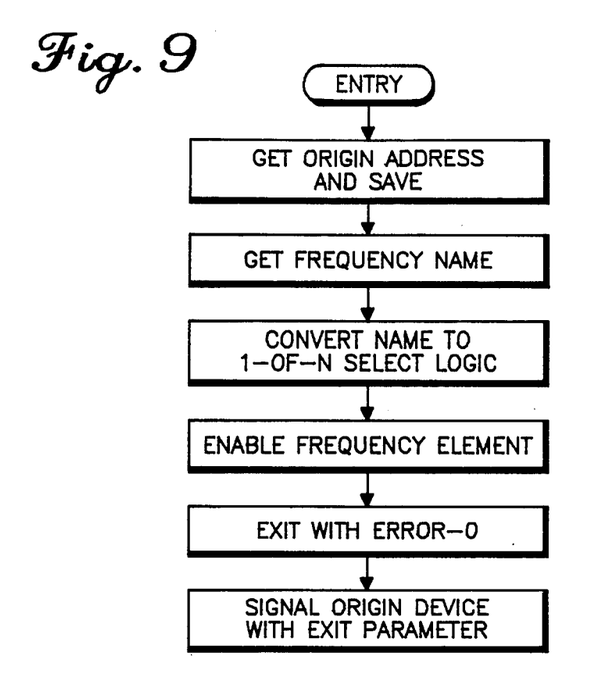
FIG. 9 is an exemplary flow diagram of a device driver routine for the channelized radio of FIG. 8.

Illustrated in FIG. 8 is a third radio 120 that does not contain a synthesizer. Frequency generation is accomplished through channel elements 810. The current receive frequency is selected by simply gating on one-of-N elements 810. FIG. 9 illustrates the flow diagram for changing the frequency in the third radio 120.

In comparing the drivers of the first 200, second 140 and third 120 radios, note that the Bus interface specification is identical in all three radios. This approach provides the "I/O independence" of the Core processor allowing common access by the Control processor 150 and Local processors 110 within the system 100.

Thus, only the Core processor 120, 140 and 200 need be designed for each new radio product to mate with existing options 110, 150, 180 and 190.

The total set of singular control drivers will vary from radio to radio and need not be restricted to present control functions. For example, the first radio 200 may contain 5 drivers: Select transmit/receive frequency, Select PL/DPL seed code, Select audio muting mode, Select transmit mode and Select receive mode.

The second radio 140 may contain 10 drivers which include all of the drivers of the first radio 200 plus, for example: Select channel scan mode, Update scan list, Select priority channel for scan, Select default scan transmit frequency and Select scan interrupt logic. The second radio 140 would be a superset of the first radio 200.

The Control 150 and Local 110 processors may be designed to accommodate all Core processor drivers and have the capability to recognize which Core processors are resident in the system 100. Moreover, it is possible, for backward compatibility, that any new Core Processor designs provide the drivers (or equivalents) of previous designs.

One possible set of singular drivers that may be implemented in a Core processore is as follows:

SELECT RECEIVE FREQUENCY
SELECT TRANSMIT FREQUENCY
SELECT PL/DPL RECEIVE CODE
SELECT PL/DPL TRANSMIT CODE
SELECT AUDIO MUTE MODE
ENABLE/DISABLE PL/DPL TRANSMIT/RECEIVE
SELECT AUDIO VOLUME LEVEL

SELECT CARRIER SQUELCH DETECT LEVEL
SELECT TRANSMIT POWER LEVEL
ENABLE/DISABLE TRANSMIT CIRCUITS
ENABLE/DISABLE STANDBY POWER MODE
SELECT TRANSMIT TIME-OUT TIME
SELECT MODULATION CHANNEL
ENABLE/DISABLE DIAGNOSTICS MODE
UPDATE CHANNEL SCAN LIST
SELECT SCAN PRIORITY SAMPLE FREQUENCIES
ENABLE/DISABLE SCAN MODE
ENABLE/DISABLE SCAN INTERRUPT LOGIC
ENABLE/DISABLE SCAN STATUS REPORTING
SELECT SCAN TRANSMIT DEFAULT FREQUENCY
ENABLE/DISABLE DIAGNOSTIC STATUS REPORTING
SELECT SCAN SERVICE LOGIC
UPDATA CODEPLUG PROGRAM LIST
PROGRAM CODEPLUG
READ CODEPLUG CONTENTS
INITIALIZE SYSTEM
ENABLE/DISABLE RECEIVE/TRANSMIT STATUS REPORTING
ENABLE/DISABLE PUBLIC ADDRESS MODE
MACRO COMMAND PROCESSORS
MACRO CONTROL DRIVERS

Many of the drivers presented above require parametic data transfer to and from the originating device. The structured Bus 230 allows for addressing and execution of each individual driver. However, to address a driver, a fair amount of data transfer must take place which takes time.

Certain processes require a series of events to take place (i.e., a series of drivers must be executed to complete the process that the device was instructed to perform). As an example, consider switching the radio from receive mode to transmit mode resulting from the operator pressing the Push-To-Talk switch. The drivers required are: (1) selecting the transmit frequency, (2) selecting the transmit PL/DPL code, (3) selecting the modulation channel, (4) selecting the transmit time-out time, (5) disabling the receive mode, (6) selecting the power output level, (7) enabling the transmit control circuits and (8) enabling the PL/DPL encoder.

The Control processor 150 (or Local processor 110) could perform this series of events by signalling 230 the Core processor 150 for each event. However, this would take too much time and would burden the Control processor 150. Moreover, the series of events may be different from one Core processor to the next, which blemishes the I/O independence.

To alleviate this problem and speed up the process, Macro Control drivers are used. Macro drivers simply link the execution of individual drivers to form a process. The linkage will occur at the microprocessor 400 machine speed rather than at Bus 230 speed.

Macro drivers are split into two modes: setup and execution. The setup mode passes 230 and retains 210 all of the parameter data required to execute the Macro. The execution mode links the individual drivers 280. Processes requiring fast response times may require Macro setup at system initialization.

Individual parameters 210 (such as, transmit frequency, PL/DPL code, etc.) may be updated as necessary internal to the Core processor without status reporting to the Control processor 150. One such process would be the switching from receive mode to transmit mode and the converse. Other Macro control drivers of the Core processor are:

CHANNEL SCAN PROCESS
PL/DPL DETECTION
STATUS REPORTING
SYSTEM DIAGNOSTICS
DIAGNOSTIC DRIVERS

Each element of the system 100, including the Core processor, contains diagnostic drivers to test the integrity of the system. Diagnostic reporting is maintained through the Control processor 150 of "off-line" via specialized test equipment.

Two types of diagnostic feedback are provided to the operator: fatal and non-fatal. A fatal report will result if the Core processor 400 or Control processor 150 fails to acknowledge command signalling 230 or if one of the major hardware elements fail 220. A non-fatal report will occur if one of the Local processors 110 fail interrogation by the Control processor 150 or if a minor element of the radio hardware fails.

CORE PROCESSOR ADDRESSING

Referring to FIG. 3, each element in the radio system 100 contains a unique address that is primarily used as enable logic. Four bits 310 are used for destination processor 400 selection. This will allow up to 15 major peripherals to be resident on a single Bus 230. The three lowest-order addresses (0H through 2H) are reserved for Core processor 120, 140 and 200 addresses.

Thus, up to three Core processors 120, 140 and 200 may reside on a single Bus 230. This allows for multi-radio installations as illustrated in FIG. 1. Only one Control processor 150 is necessary to control the operation of three radios, such as High-Band, UHF-450 and UHF-800, for example.

Local processors 110 may be shared among the three radios 120, 140 and 200.

CORE PROCESSOR STATUS REPORTING DRIVERS

Drivers 280 are included in the system's Core processor 400 to report the status of various control signals, such as channel activity, PL/DPL detect, synthesizer lock, standby mode, transmit power, etc.

These drivers 400 are normally interrogated by the Control processor 150 (or Local processor 110) or may be combined with a Macro driver for continuous monitoring.

CODEPLUG PROGRAMMING

It is desirable that nonvolatile parameters 290 of the Core processor 400 (or the rest of the system) which are normally stored in codeplug 290 be programmable via the Bus 230. The control element may be the Control processor 150 or external equipment.

This will allow personalization of each system 100 to be dynamically and automatically configured via factory computers. Systems 100 may be easily reconfigured in the field and no alternative codeplug 290 stocking is required.

ANALOG CONTROL

Audio volume level and carrier squelch circuits are controlled via analog potentiometers in the control head 150 and are normally under user control. A four bit word is output by the Core processor 400 to provide 16 levels of audio volume and 16 levels of squelch attack. A D/A converter following the Core processor 400 will provide a DC level to the volume and squelch circuits 220. The volume D/A is logarithmic and the squelch is linear.

The drivers 280 for volume and squelch will be accessible to the Control processor 150 and Local processors 110. The user will have the capability to set a precise level via the Control processor 150 keyboard 170 or simply ramp-up or ramp-down to a desired level.

Local processors 110 will be able to set fixed volume and squelch levels for selective calling and transmit inhibit logic, respectively.

MODULATION CHANNELS

Many of the Local processor systems 110, like Digital Voice Storage, Trunking, Digital Voice Privacy, Queued Community Repeater, etc., are R.F. signalling systems requiring access to the modulator circuits. This system provides four channels for this function internal to the radio package 220. The channels are controlled through the Core processor 400 and assignments are made by the Control processor 150. Local processors 110 may override these assignments.

Three of the four channels are processed by the radio circuits, providing AGC, preemphasis and splatter filtering. The remaining channel is routed directly to the modulator and is normally used for baseband data systems, such as Trunking and Digital Voice Privacy.

TRANSMIT POWER LEVEL

This system 100 provides two bits of transmit power level control allowing up to four discrete levels of transmit power. The Core processor 400 controls the interface and assignments are made from the Control Processor 150 or Local processors 110.

POWER STANDBY MODE

Drivers 280 are provided in the Core processor 400 to place the radio hardware in the standby mode to reduce system power consumption. The driver 280 will retain all current parameters 210 of the system 100 and allow a timed transition from full-power to standby. The Core processor 400 will retain power during standby and Local processors 190, within the radio package, have the option of standby control. The control processor 400 (or Local processor 110) may also control the standby mode.

CHANNEL SCAN

Channel scan systems require direct interface to the radio hardward 220. The Core processor 400 will provide the necessary drivers 280 to perform the scan logic. However, the parameters 210 of the scan are provided by the Control processor 150 or a separate scan Local processor 110. The parameters 210 include: non-priority scan list, priority scan list, transmit default frequency, etc. Scan status will be available to the controlling element for further control, such as PL/DPL scan or signalling controlled scan.

PUBLIC ADDRESS MODE

The Core processor 400 will have the capability to patch one of the four modulation channels 250 directly to the audio control circuits bypassing the receiver circuits. This will allow Public Address modes that are necessary for certain systems including Digital Voice Storage.

CONTROL PROCESSOR

The Control processor 150 provides the human interface to the system. It does so by way of a keyboard system 170 and display system 150. It 150/280 also defines the configuration of the system 100.

KEYBOARD SYSTEM

The keyboard system 170 is composed of a matrix keyboard and various drivers 280 that interface 400 with the Bus 230. The drivers 280 are locally controlled by the Control processor 150/400 and remotely controlled by Local processors 110.

There are two basic keyboard configurations available to the user and are normally system dependent. The dynamic configuration allows for full data entry and option selection via so-called "soft" key identification. The static mode allows for a one-to-one mapping (i.e., so-called "menu" mapping) of the keys to codeplug defined modes.

With the static configuration, the operator need only press one or two keys to define the current operating mode of a radio subsystem. The selected mode will define the transmit and receive frequencies, scan list and logic, transmit time-out time, PL/DPL transmit and receive codes, etc. It will also place any Local processors 110 into their "default" run mode.

The controlling parameters of the static mode configuration, that apply to radio operation, may be resident in both the Core processor 400 and the Control processor 150 and are initialized at system power-up.

The dynamic mode allows all of the capabilities of the static mode plus extended control and data entry. For example, the operator will be able to enter his own priorities and non-priorities for channel scan, select his Unit and Group IDs with the Select Call Local processor 110(A), select any desired muting modes, select a telephone patch 110(B), etc.

Keyboard entry feedback will be provided with tones and display techniques. Complex entries are handled through logical, human engineered prompting (i.e., menus) on the display with error control logic.

Three drivers are used for multiplexed access of the keyboard and display: single key, multiple key and command parsing. The Control processor 150 uses all three drivers and provides access to Local processors 110. The single key and multiple key drivers are available to Local processors 110 for data entry and may bypass the Control processor 150. Command parsing is performed exclusively by the Control processor 400.

DISPLAY SYSTEM

The display system 160 provides two major junctions: keyboard 170 entry feedback with prompting and system status reporting. The display 160 is a character dot matrix with graphics capability under direct control of the Control processor 150.

The display drivers 280 are used by the Control processor 150 and Local processors 110 to provide entry feedback and status monitoring of the system.

SYSTEM CONTROL

The Control processor 150 is the primary interface and operating system of the Core processor 400/120, 140 or 200 and defines the minimum system. It also controls the interface of Local processors 110 in the system 100. At initialization time, the Control processor 150 interrogates all of the possible board addresses and configures the system 100 to recognize only relevant addresses.

The control processor 150 provides the Bus 230 synchronization and timing.

LOCAL PROCESSORS

Local processors 110 provide the options and expansions of system 100 and are mated to the serial Bus 230 internally 190 and externally 180 to the radio package 200.

Each Local processor board 110 contains a programmable address for each major junction. Local processor systems 110 may be combined on a single board with the same address and utilize the same bus interface 230.

Local processors 110 communicate with the Control processor 150 and the Core processor 400 as an integrated system. The Bus interface is structured and standard to all Local processors 110 which allow their use with all radio products 120, 140 and 200 and option systems 180 and 190.

While the Local processors 110 are not stand-alone systems, a system radio may add or delete Local processors 110 from the system 100 without hardware or software modifications. The Control processor 150 will recognize the change. Thus, the radio system 100 becomes installation and I/O independent, increasing the reliability of the communications system 100.

Local processor default parameters 280/290 always reside with the Local processor hardware 400 and not with the Control processor 150. However, the Control processor 150 may alter various parameters 210 of the Local processors 110 under control of the Local processor 110. For example, consider the Local processor for Select Call 110(A).

The Select Call system 110(A) requires a codeplug 290 to be resident containing the Unit, Group and Fleet Identification codes, muting mode and system configuration. By way of the Control processor 150, the operator may change the Unit and Group ID codes but will not be able to change the Fleet code or configuration. Changing the Unit code does not replace the hard-programmed Unit code 290 but simply provides a "temporary" 210 Unit code by which the radio may be addressed.

It is up to the individual Local processor 110 to decide on the volatility of its parameters.

Local processors 110 that demand system control, such as Trunking 110(C) and Queued Community Repeater, may bypass the control of the Control processor 150 and make it a "slave" to the Local processor 110. In this mode, the Control processor 150 will continue to provide the Bus timing and synchronization and operator interface but does not control the system 100.

The Control processor 150 may have the capability to place Local processors 110 on-line or off-line due to a fault in the system or reconfiguration. For example, the operator may mode select 170 which channels are Trunked or Conventional.

The following represents a list of possible Local processor systems:

SELECT CALL
DIGITAL VOICE STORAGE
QUICK CALL II
TELEPHONE PATCH
MULTI-FREQUENCY TRUNKING
QUEUED COMMUNITY REPEATER
SINGLE TONE ENCODE/DECODE
DIGITAL VOICE PRIVACY
ANALOG VOICE SCRAMBLER
CONSOLE SYSTEM
DATA TERMINAL
SCAN
LORAN-C LOCATION SYSTEM
ZVEI/CCIR SIGNALLING

SERIAL BUS

The serial Bus 230 provides the physical interface of all processors 400 in the system. It consists of a 2-wire link (signal and ground) and may be bussed internal 190 to the radio as well as external 180.

SYNCHRONOUS DATA

The system Bus 230 is fully synchronous using baseband data at 2400 bits per second. No clock signal is required since clock recovery is performed by each of the system processors. (Due to the speed requirements of the system and the response times necessary for various commands, a preprocessor may be required for some of the Local processors 110. The preprocessor is a simple 4-bit machine that performs all of the necessary signalling to interface with the serial bus 230. This includes signalling intensive systems like Select Call 110(A) and Trunking 110(C).)

CONTROL PROCESSOR POLLING

Referring to FIG. 3, signalling among processors 400 in the system 100 is accomplished through variable sized data packets. The data packets are asserted on the bus asynchronously or by way of a polling format generated by the Control processor 150.

Each data packet consists of a 12-bit sync code, 4-bit source address, 4-bit destination address, 4-bit byte count, 8-bit operation code, from 0 to 15 data bytes and an 8-bit Cyclically Redundancy Check (CRC) code.

Figures 10, 11:
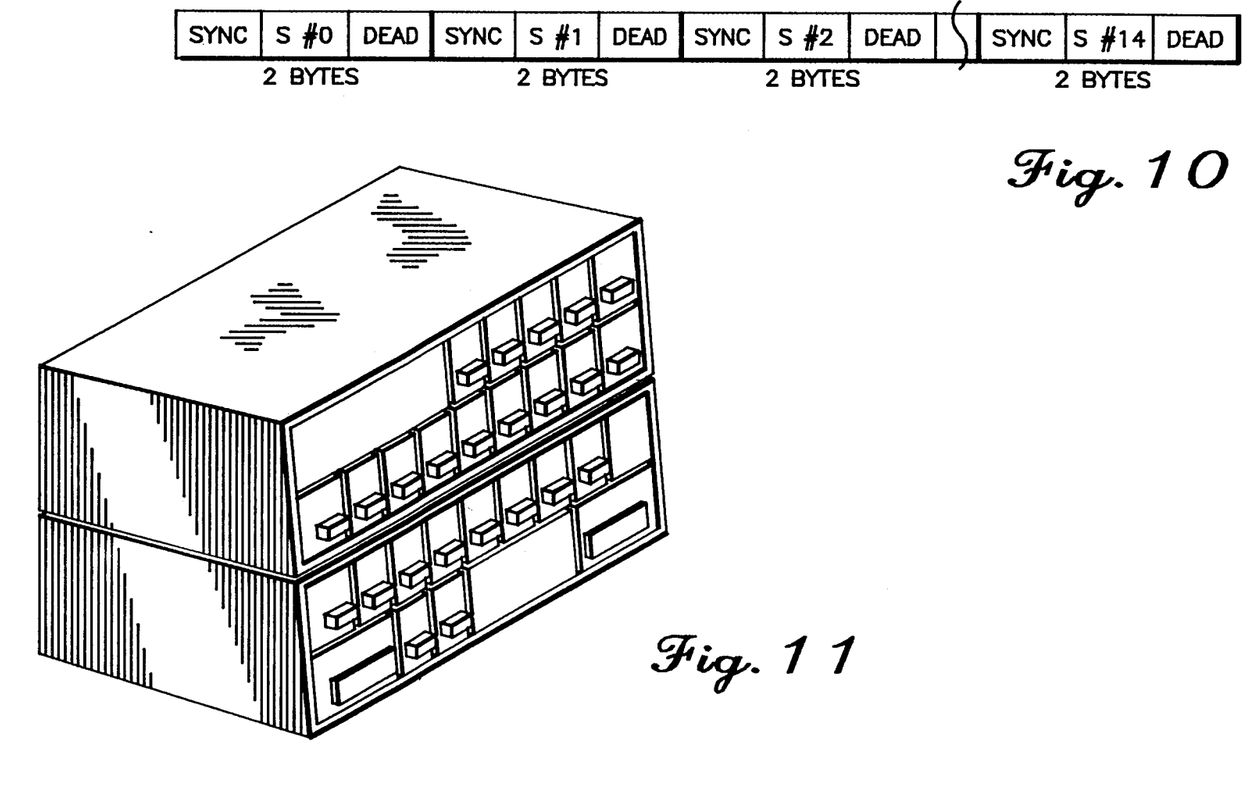
FIG. 10 is the serial link polling scheme according to the present invention.
FIG. 11 is an illustration of a conventional control head that is not necessarily fully configured.
Figure 12A:
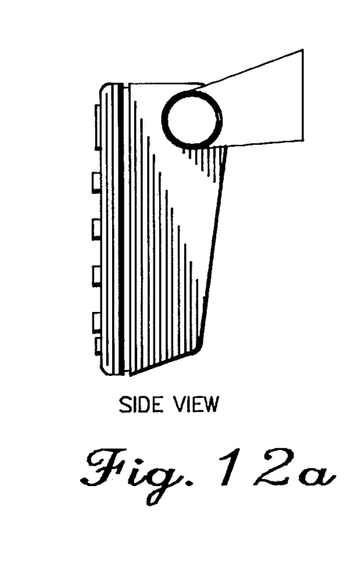
FIGS. 12a, 12b, and 12c illustrate the side view, front view, and top view, respectively, of a human-engineered, fully configured control head according to the preferred embodiment of the present invention.
Figure 12B:
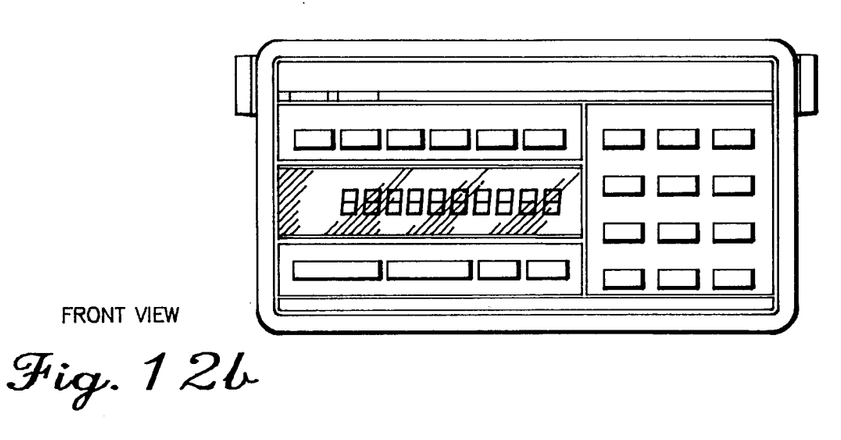
Figure 12C:
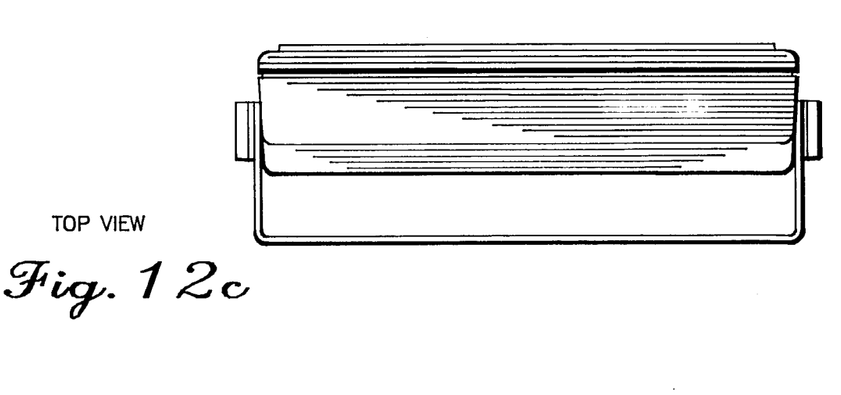

The sync code and source address are generated by the control processor 150 with the poll format found in FIG. 10. The dead period is 4 bits long and is the zone where an asserting processor 400 will place the destination address. Upon recognizing a valid address in the dead zone, the Control processor 150 will relinquish control of the bus 230 and resume control at the end of the data packet CRC code, where the poll will continue.

CONTROL PROCESSOR PRIORITY

Since the Control processor 150 controls the poll addressing (or sequencing), it may assert control at any time and establish priority over other processors in the system 100. This feature allows fast response times to operator inputs, such as Push-To-Talk and mode selections, etc.

COMMAND ACKNOWLEDGEMENT

All commands issued by the Control processor 150 or Local processors 110 are acknowledged in this system 100. The acknowledge packet must occur within the next poll cycle or retransmission will result. The number of retransmissions will be limited and the operator will be informed of a fault if the destination processor 400 fails to respond.

DYNAMIC ADDRESSING

Each of the Local processors 110 and the Core processor 150 contain a hard-programmed board address that is used in select logic during the poll sequence. At power-up time, the Control processor 150 interrogates all of the possible address values to determine the poll sequence. The Control processor 150 may alter the board address dynamically to conform to a sequential poll. A board is deselected from the system by excluding its address from the poll.

HARDWARE

Some consideration should be given to the hardware requirements of the system. Since it is a multi-processor 400 system to be used in a mobile environment, it is recommended that low power microprocessors 400 be used and internally "bus" oriented systems be avoided. This limits the design to single-chip CMOS processors with today's technology.

The Bus interface circuit 400 should be designed for fail-soft and not load the Bus 230 if a local failure occurs. The system may continue to function, for example, if one of the Local processors 110 fail.

The D/A interface used with the volume and squelch (and power level) functions should be standard from radio to radio so that the same data word will cause the same output level.

The display 160 and keyboard 170 functions of the Control processor 150 should be stand-alone systems so that the Control processor 150 is not burdened by display refresh or keyboard scanning, etc.

The radio package 120, 140 and 200 should provide power switching capability if the standby function is to be used.

The Bus receiver interface circuit 400 should provide sufficient gain to compensate for voltage offsets but not too much gain to cause noise when no signal is present. This may cause unnecessary falsing in the system.

Any external control elements of the processor systems should be "latched" so that the primary task is monitoring the serial Bus 230 for data. The acknowledge function will allow certain tasks to miss the poll address. However, the number of retransmissions are limited and should be considered in the design.

The Bus receiver logic of all processors will employ PLL clock recovery techniques to provide mid-bit sampling of the data. This clock is also used for asserting data on the Bus and care should be taken to provide "smooth" bit transitions without "glitches." Also, the Bus data is baseband requiring proper phasing of the receiver.

MECHANICS

The mechanics of the Control processor system 150 (i.e., the control head) will be intimately related to the electronics. The package should be as small as possible with enough room to accommodate the display 160 and keyboard 170. The Bus 230 interconnect scheme should allow for expansion with Local processors 110 that are external 180 to the radio 120, 140 and 200. A significant amount of styling is required.

Thus, there has been provided a reliable, internally, register-modelled, addressable, internally, serially-bussed mobile radio architecture with logical, human engineered control and operator validation feedback.

Further, there has been provided a reliable, internally, register-modelled, addressable, internally, serially-bussed mobile radio architecture with logical, human engineered control and operator validation feedback that:

provides an incredibly flexibly architected radio structure;

distributes the command and control processing among various radio subsystems, providing them with a greater degree of flexibility and autonomy;

provides simple and reliable cabling interconnections between radio peripheral components;

employs a "smart" control head that may be multiplexed with each functioal subsystem to facilitate operator input, output and feedback required for the command and control of each subsystem;

provides a radio system capable of having a multiplicity of various radios, functions, features and enhancements in a single, mobile system without unnecessary redundancy of control heads and functional subsystems; and provides logical, human engineered system control and operator validation feedback.

It will be appreciated by those skilled in the art that this register-modelled invention may be practiced by making design tradeoffs between the complexity and simplicity of the operation code set and the register modelling. The register set can be virtually eliminated, as such, and simulated in software variables with an extensive and particularized operation code set—much larger and richer than the read, write and acknowledge set a of primitives discussed above. However, some of the I/O independence is lost through this compromised, but expedient approach.

For example, rather than simply writing data to be displayed into a register as a data argument to a write op-code, a new op-code, defined as write-to-display could be defined with a data argument that would simulate the same function. However, some of the I/O independence is lost because the new write-to-display op-code is not an op-code that is generic to the entire system, but only has meaning to a display device. Thus, there is a design tradeoff between simplicity and primitiveness of the operations codes or complexity and richness and I/O independence. But, in either case, the objects of the present invention are met.

An intermediate approach is described in the background document describing the Longhorn replacement to the Systems 90 control system, filed on an even date herewith, that uses the primitive set of op-codes, namely: reset, read, write, bit clear, bit set, acknowledge and negative acknowledge, but then adds more, yet somewhat generic op-codes, namely: request display, show display, short register is, long register is, name is, and display is for commonly used display and status functions, and read a short register, read a long register, write to a short register, write to a long register, update a short register, update a long register, similar to multiple precision numbers, in order to more efficiently handle multibyte strings. In this type of register-modelling, registers are used as virtual representations of a physical device, only at a more fundamental level. The register models a physical component (e.g., the display) rather than the entire peripheral device (e.g., the control head). However, the underlying concept is the same.

An even greater tradeoff is presented in the background paper describing the Lightning Serial Bus, filed on an even date herewith. The primitive set of operation codes is splintered into a rich variety of nearly discrete op-codes that implement functions very closely associated with the physical device itself.

It will be further appreciated by those skilled in the art that the foregoing description of the various embodiments are merely illustrative of the broad inventing concept comprehended by the invention and has been given for clarity of understanding by way of unrestricted example. However, it is not intended to cover all changes and modifications which do not constitute departures from the spirit and scope of the invention.

We claim:

1. A method of communicating information between a plurality of register-modelled processor means cooperatively operating within a radio device, comprising the steps of:
    (a) generating, in any of the plurality of register-modelled processor means, an information packet having at least an operation code and an argument,
    (b) transmitting, serially, said information packet to at least one of the plurality of register-modelled processor means over a serial communication link,
    (c) receiving, serially, said information packet from said serial communications link,
    (d) performing the operation designated by said operation code in cooperation with said argument.

2. A method as claimed in claim 1 wherein said register-modelled processor means have predetermined addresses and wherein said generating and said preforming steps further comprise, respectively, the steps of:
    generating an information packet further having an address corresponding to another register-modelled processor means, and
    performing said operation when said address corresponds to said receiving register-modelled processor mean's predetermined address.

3. A method as claimed in claim 1 wherein said generating and said performing steps further comprise, respectively, the steps of:
    generating an information packet further having a register address, and
    performing said operation in cooperation with said addressed register when said address corresponds to a register defined within said receiving register-modelled processor's mean's register set.

4. A method as claimed in claim 1 wherein said generating and said performing steps further comprise, respectively, the steps of:
    generating an information packet further having a register address and having data as an argument to said operation code, and
    performing said operation upon said data in cooperation with said addressed register when said address corresponds to a register defined within said receiving register-modelled processor mean's register set.

5. A method as claimed in claim 1 wherein said operation code is a primitive operation code chosen from the group of primitive operation codes:
    reset, read, write, bit set, bit clear, acknowledge, and negative acknowledge.

6. A method as claimed in claim 1 wherein said information packet further comprises:
    an error detection device.

7. A protocol as claimed in claim 6 wherein said error detection device further comprises:
    a cyclical redundancy check (CRC) packet.

8. A register-modelled radio device, having addressable register means, comprising:
    a plurality of register-modelled processor means having addressable register means for modelling the virtual state of said processor and
    communication means, comprising a serial bus, interconnecting said register-modelled processor means, for communicating between said addressable register means,
    a communications protocol for passing information to or from said addressable register means, comprising an information packet, further comprising:
        an address,
        an operation code, further comprising:
            a primative operation code chosen from the group of primatives: reset, read, write, bit set, bit clear, acknowledge, and negative acknowledge,
        optional data, and
        an error detection device, further comprising:
            a cyclical redundancy check packet,
        whereby the virtual state of said register-modelled processor means may be determined or altered by, respectively, communicating information from or to said addressable register means.

* * * * *